Aug. 30, 1927.  
B. M. W. HANSON  
1,640,992  
METHOD OF AND APPARATUS FOR GRINDING THREADED MEMBERS AND THE LIKE  
Filed March 27, 1925    8 Sheets-Sheet 1
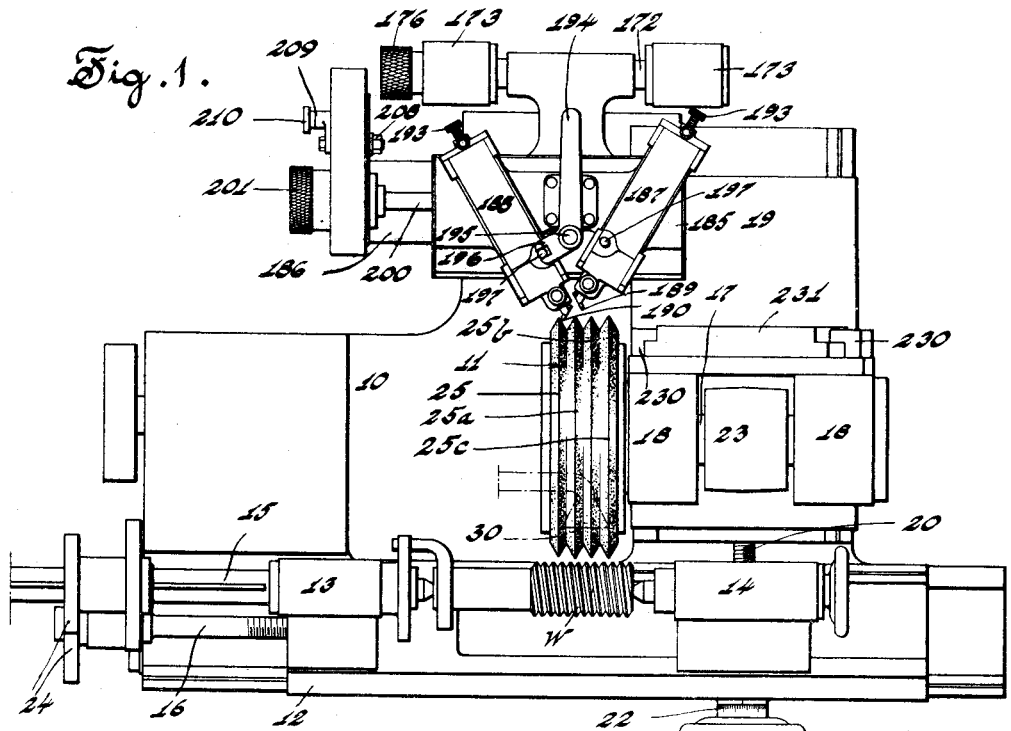
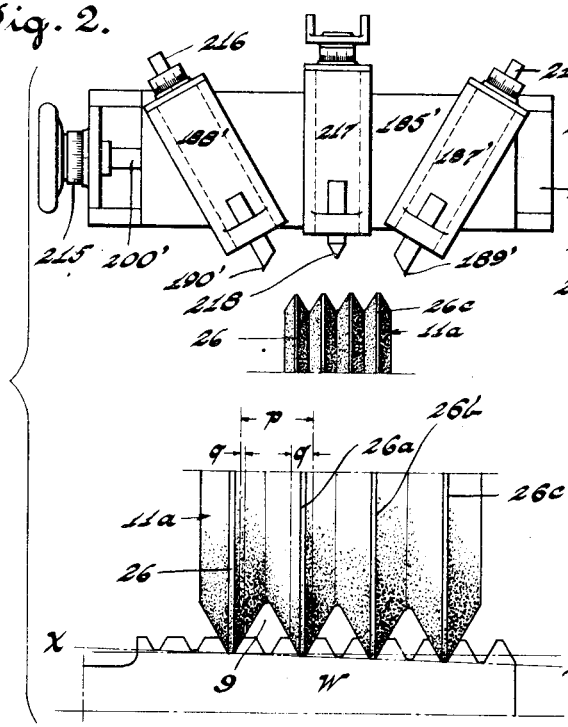
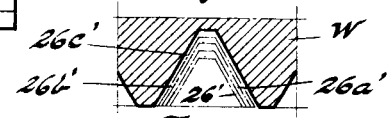
Inventor  
Bengt M. W. Hanson  
by W. Clay Lindsey  
his Attorney

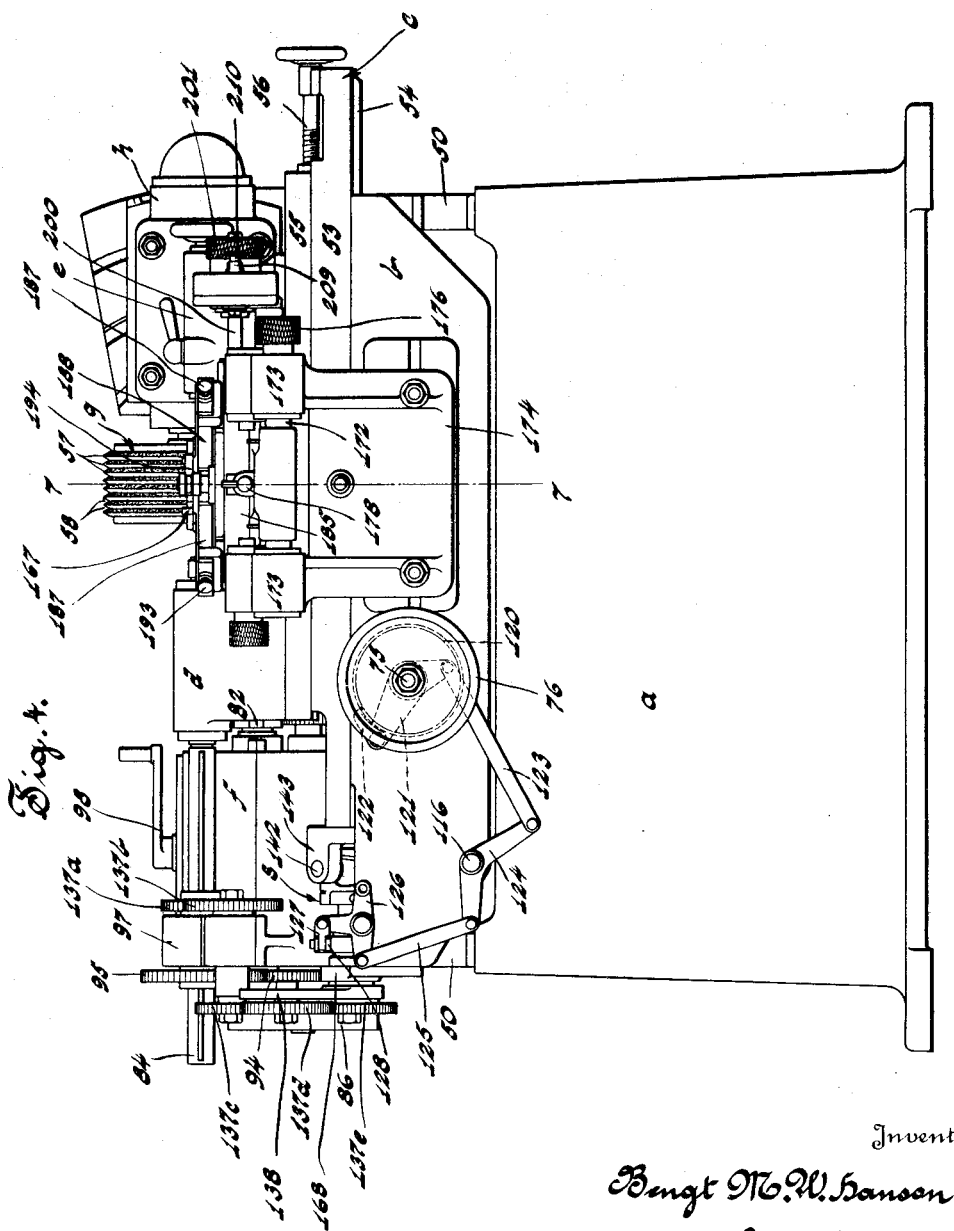

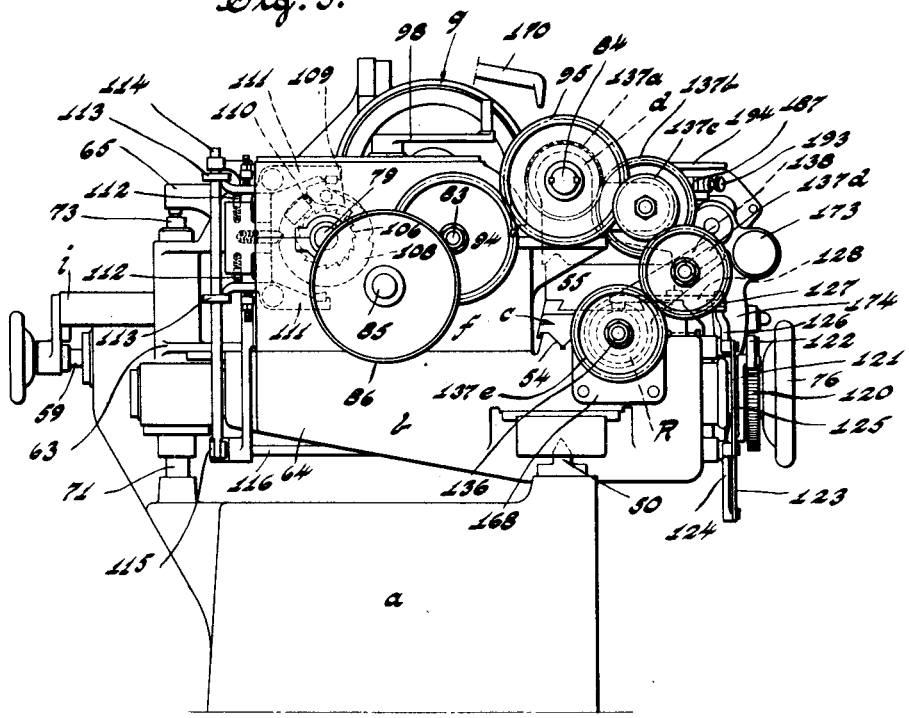
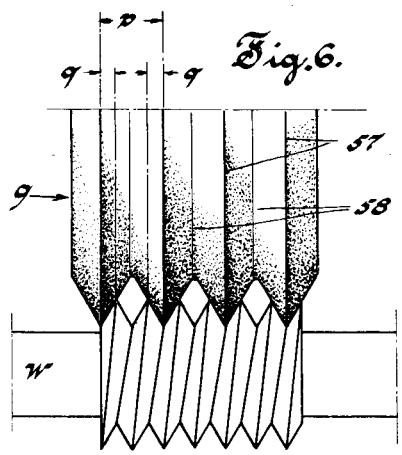

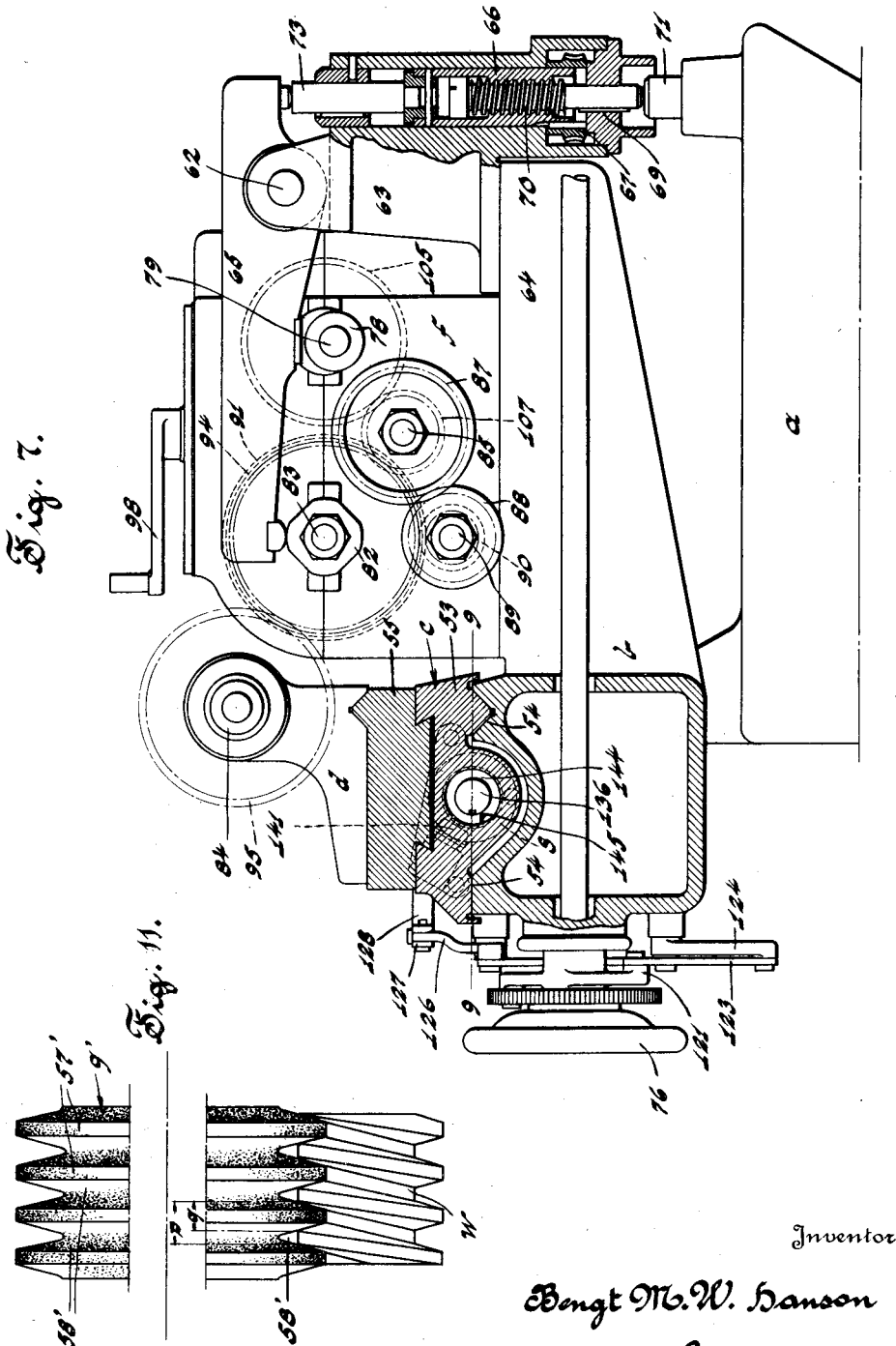

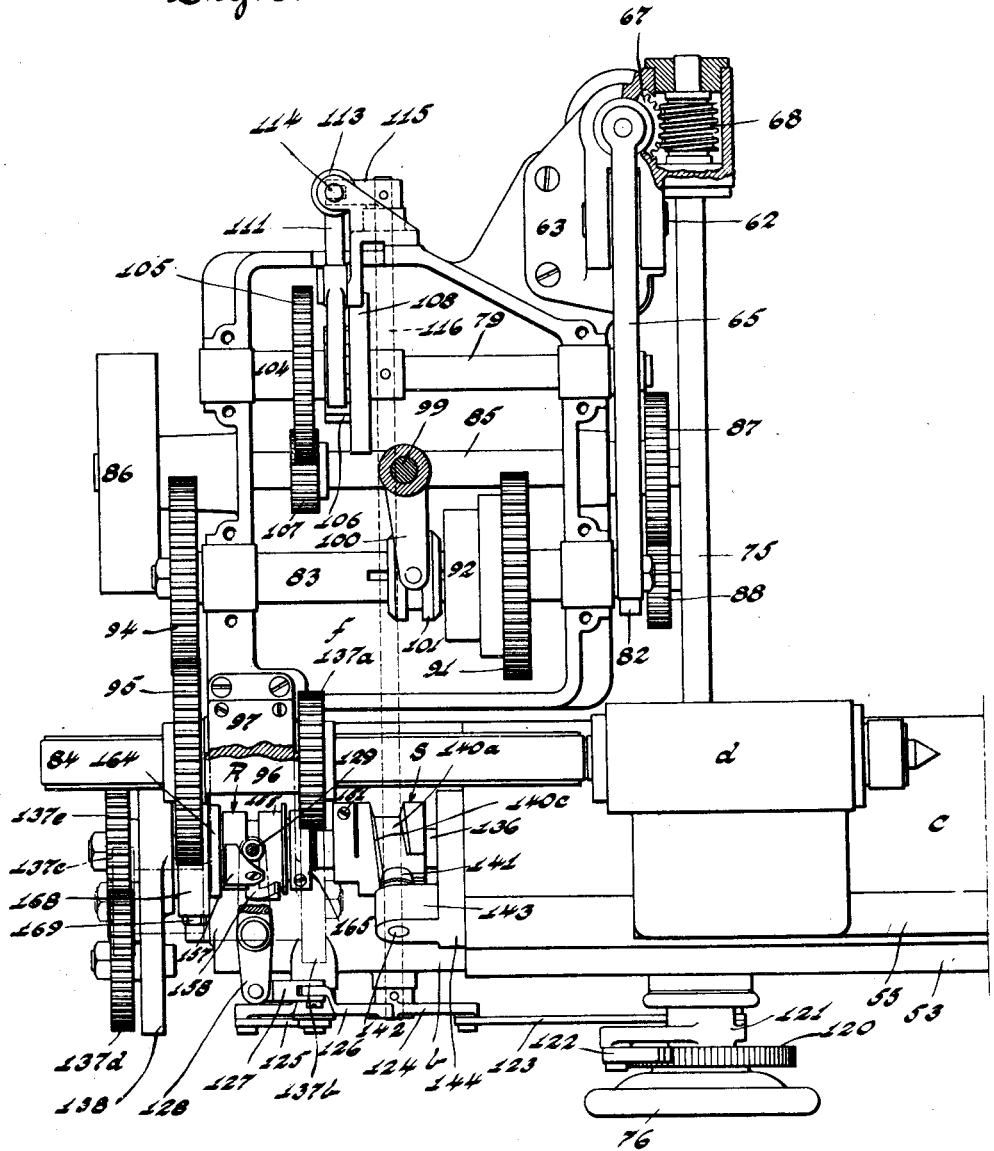

Aug. 30, 1927. 1,640,992
B. M. W. HANSON
METHOD OF AND APPARATUS FOR GRINDING THREADED MEMBERS AND THE LIKE
Filed March 27, 1925 8 Sheets-Sheet 6

Inventor
Bengt M.W. Hanson
By J. Clay Lindsey
His Attorney

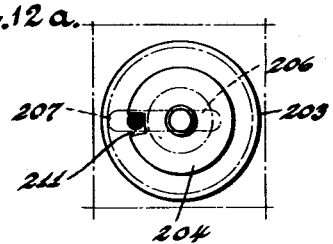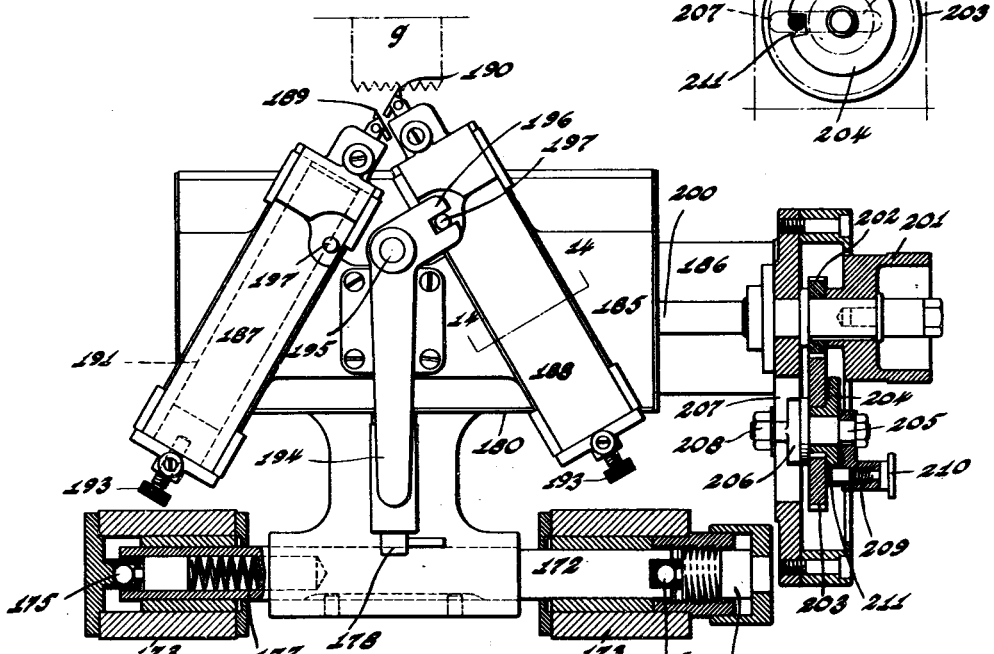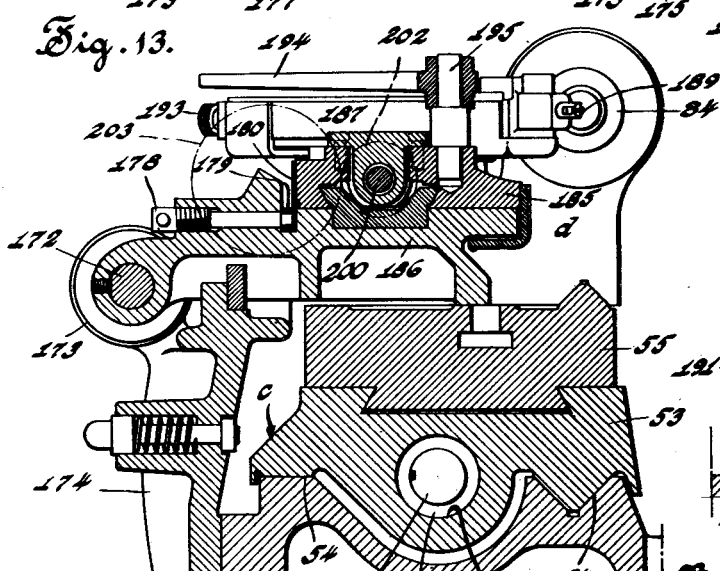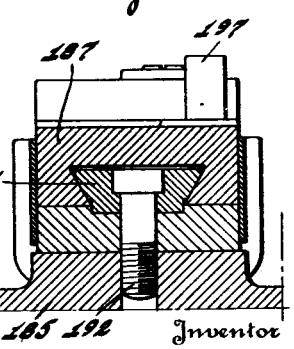

Aug. 30, 1927.  B. M. W. HANSON  1,640,992
METHOD OF AND APPARATUS FOR GRINDING THREADED MEMBERS AND THE LIKE
Filed March 27. 1925     8 Sheets-Sheet 8
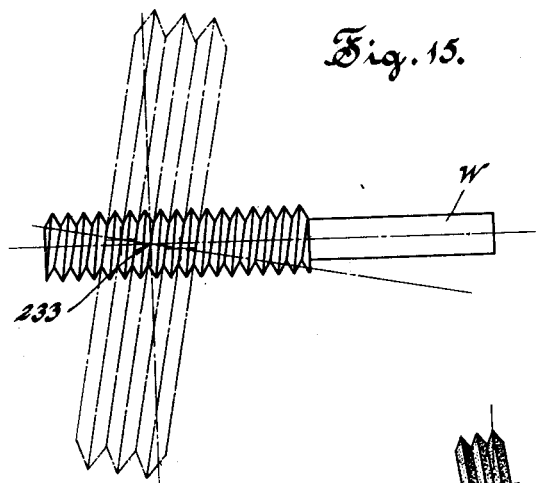
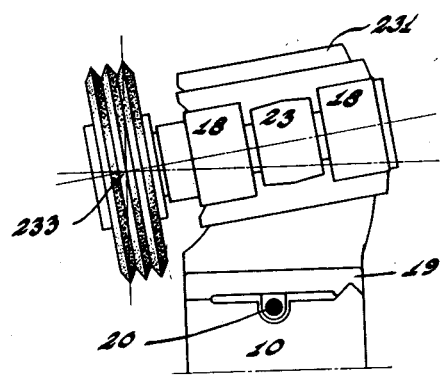
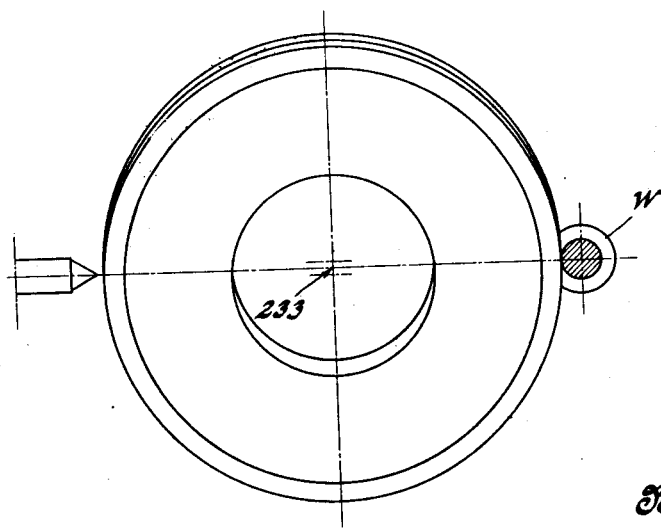
Inventor
Bengt M. W. Hanson
By N. Clay Lindsey
His Attorney Patented Aug. 30, 1927.

1,640,992

UNITED STATES PATENT OFFICE.

BENGT M. W. HANSON, OF HARTFORD, CONNECTICUT; EINAR A. HANSON AND CLARENCE E. WHITNEY, EXECUTORS OF SAID BENGT M. W. HANSON, DECEASED.

METHOD OF AND APPARATUS FOR GRINDING THREADED MEMBERS AND THE LIKE.

Application filed March 27, 1925. Serial No. 18,835.

This invention relates to the art of grinding, and has particular reference to an improved method of, and apparatus for grinding grooved or threaded members, such as taps, thread cutting hobs, lead screws, or the like, so as to give to the grooves or threads accuracy and precision in all respects. The improvements of the present invention may be employed for forming and finishing threads, for instance, or for finishing threads after the same have been roughed out, but they find peculiar adaptability in finishing grooved or threaded members after the members have been hardened.

Formerly, the practice followed in the manufacture of hardened grooved or threaded members, such as threaded gauges, taps, lead screws, and the like, was to merely cut, by means of a metal tool, the threads as accurately as possible on a piece of metal before it was tempered, and then harden the threaded member without taking any further steps to eliminate the inaccuracies and errors introduced into the thread by the hardening process. It may be here said that, from a practical standpoint, it is impossible to cut or true a thread on a hardened piece of metal by the use of a metal tool, for no metal is known to exist which will cut or shear a piece of metal of the hardness required, for instance, in a tap.

More recently, I have followed the practice of truing the threads of a tap or the like, after it has been hardened by means of a grinding wheel having a single cutting edge with a cross sectional shape corresponding to that of the groove of the thread to be trued, the wheel and tap being moved one longitudinally relative to the other, in accordance with the pitch of the thread, so that the wheel successively operated upon the thread convolutions from one end to the other of the threaded portion of the work. While this practice is of advantage, it is open to certain objections, among which may be mentioned the length of time required to true the thread on the work, it being necessary to repeatedly move the grinding wheel or work axially of the work the full length of the threaded portion thereon, and considerable time is also consumed in repeatedly truing the single edge of the grinding wheel, which edge has to bear the entire burden or brunt of grinding the thread from end to end. Furthermore, errors, during the grinding operations, are very apt to occur due to the relatively rapid wearing down of the wheel and the necessity of more or less frequently displacing the grinding wheel relative to the work for the purpose of resurfacing or shaping the wheel.

The aim of the present invention is to provide an improved method of, and apparatus for, grinding grooved or threaded members, particularly after they have been hardened, wherein the above and other objections and disadvantages incident to the practices heretofore followed are eliminated and, more particularly, to provide certain improvements in the art of grinding, by means of which the grooves or threads may be quickly and economically ground with extreme accuracy in all particulars so that a superior product may be more economically produced.

Broadly speaking, my invention contemplates an improved method, and apparatus for carrying the same into effect, wherein a plurality of convolutions, for instance, of the thread to be operated upon, are simultaneously ground by a grinding wheel having a plurality of concentric cutting edges or ribs. By proceeding in accordance with the present invention,—since, instead of a single grinding edge doing all the work, a number of grinding serrations are simultaneously effective,—the speed at which the grinding operations are performed is very greatly increased, and the wear upon the serrations is materially decreased so that the time consumed in maintaining the grinding wheel in condition for accurate grinding is considerably reduced. Furthermore, the likelihood of errors in the work, due to the rapid wearing down of a grinding wheel with a single cutting edge, and the necessity of frequently truing that edge, is substantially eliminated or, at least, reduced to a minimum. This all means that the rate of production and the capacity of the machine are very high, while, at the same time, the operations are carried out with accuracy and precision so that the pieces of work are very superior and may be economically manufactured.

A generic object of the present invention is to prevent the work from becoming overheated and turning blue and having its temper drawn owing to the heat generated by the abrasive action of the plurality of serrations. To this end, the serrations of the grinding wheel are so arranged and constructed that a cooling fluid may be passed, during the entire grinding operation, through spaces provided between the grinding wheel and each of the convolutions of the thread operated upon. A further advantage of the arrangement of the serrations on the wheel is that the heat of the abrasive action on each convolution or rib on the work, since each convolution at any one instance is operated upon on one side face only, is relatively less than would be the case if both side faces of the convolutions were simultaneously operated upon by the serrations. The arrangement of the serrations on the grinding wheel, in addition to providing spaces through which a fluid may pass so as to maintain the work relatively cool during the grinding operation, is also of advantage in that the serrations may be accurately trued, there being ample room between the serrations to accommodate truing mechanism as hereinafter described more in detail.

A further aim of the present invention is to provide a machine or apparatus of the character described with means for shaping or truing the serrations of the grinding wheel, the arrangement being characterized by various features of novelty and advantage, and, particularly, by the accuracy and facility with which the serrations may be shaped and trued.

In accordance with one species of the invention, and to which species certain of the appended claims are particularly directed, the cutting edges, serrations, or ribs of the grinding wheel are so arranged and constructed that they will successively grind increments from the successive convolutions or grooves of the work; that is to say, the serrations will grind the work down to the proper form in stages or steps, each rib or serration performing that portion of the duty assigned to it. It is to be understood, however, that my invention, broady considered, and certain of the appended claims, are not limited to this species of the invention.

Other objects will be in part obvious and in part pointed out more in detail hereinafter.

The principles of the invention may be embodied or employed in machines of appropriate construction or design. In the accompanying drawings I have shown two forms of apparatus, either of which may be employed for carrying out the generic features of the invention, but it is to be understood that these showings are merely by way of illustration.

This is in part a continuation of my application Serial No. 754,745, filed December 9, 1924.

Figures 1 to 3<sup>b</sup>, inclusive, illustrate, more or less diagrammatically, a machine and process disclosed in my application Serial No. 640,351, filed May 21, 1923; said application 754,745 having been filed as a division, in part, of said application 640,351.

Figures 4 to 10, inclusive, illustrate a machine which, together with the method involved in its use, in so far as they constitute a different species of the generic invention, is made the subject-matter of my co-pending application, Serial No. 691,643, filed February 9, 1924.

Figure 1 is a diagrammatic view showing, in top plan, one form of apparatus which may be employed for carrying out the invention;

Fig. 2 is a diagrammatic view similar to Fig. 1 and showing a different form of wheel and truing device, a portion of the wheel being exaggerated;

Fig. 3 is an enlarged diagrammatic view showing the manner in which the serrations of the grinding wheel, disclosed in Fig. 1, successively cut small increments from the thread;

Figure 9:
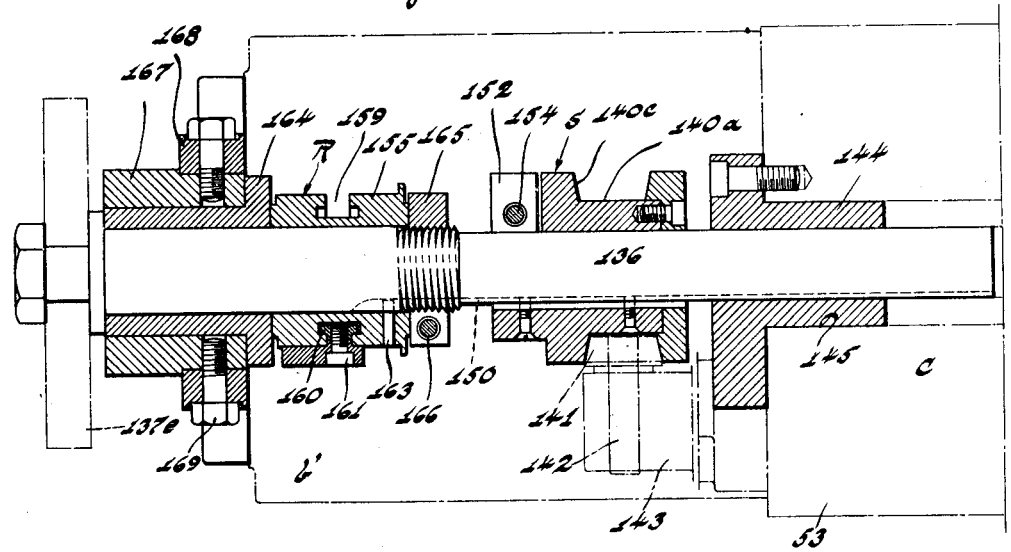
Figure 10:
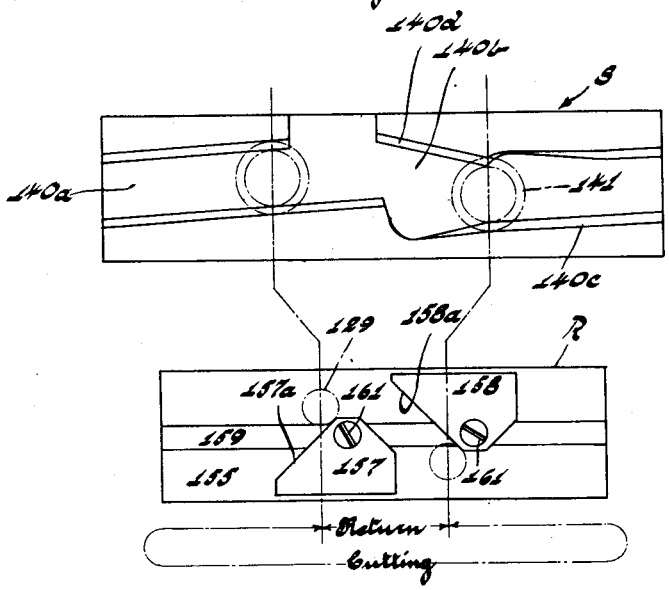

Fig. 3$^a$ is a view similar to Fig. 3 and shows the manner in which a thread or groove is ground when the grinding wheel, illustrated in Fig. 2, is employed;

Fig. 3$^b$ is a similar view showing the manner in which a Whitworth thread is ground;

Fig. 4 is a front view of another form which the machine may take;

Fig. 5 is a left hand end view of the machine of Fig. 4;

Fig. 6 is a view showing more or less diagrammatically, the manner in which the grinding wheel, employed in the machines of Figs. 4 and 5, operates upon the work;

Fig. 7 is a vertical sectional view taken substantially on line 7—7 of Fig. 4, the truing device being omitted;

Fig. 8 is a plan view of the left hand side of the machine of Figs. 4 and 5, with parts in section and other parts removed for purposes of clearness;

Fig. 9 is a detail view showing, in horizontal section, the cam for reciprocating the work holder and the cam for controlling the feeding movement of the work relatively to the wheel and the withdrawal movement of the work upon its return stroke, this view being taken substantially on line 9—9 of Fig. 7;

Fig. 10 is a diagrammatic view showing the relation between these cams;

Fig. 11 is a view similar to Fig. 6 but showing a grinding wheel having a plurality of serrations finishing an acme or truncated thread;

Fig. 12 is a top plan view of the truing device which may be employed in either of the machines illustrated;

Fig. 12ª is a detail view of parts of the indexing means of the truing device;

Fig. 13 is a sectional view through the truing device and shows the same carried by the rocking bed of the machine illustrated in Figs. 4 and 5;

Fig. 14 is a detail view taken substantially on the line 14—14 of Fig. 12;

Fig. 15 is a diagrammatic view showing the relative angular positions of the grinding wheel and work when the latter has a thread of large lead to be ground;

Fig. 16 is an end view of the arrangement shown in Fig. 15 and additionally indicates the position of the device for truing the wheel; and Fig. 17 is a detail view showing an arrangement which permits the angular adjustment of the grinding wheel.

Referring to the drawings, and particularly to that embodiment shown in Figs. 1 to 3ᵇ, inclusive, 10 is a base upon which is slidably mounted the grinding device here shown as being in the form of a grinding wheel 11 having a plurality of serrations, as hereinafter described. 12 is a carriage on which the work is supported, in the present instance the work supporting means being in the form of head and tail stocks 13 and 14, respectively, the head stock being provided with a splined spindle 15. In the selected illustrative disclosure, during the grinding operation the wheel is rotated rapidly but has no movement in the direction of its axis, and the work, indicated by the letter W, is slowly rotated by the driven spindle 15 and is moved axially, as by means of the lead screw 16, the relative motions of the work being so proportioned that the serrations provided on the periphery of the grinding wheel will form or finish the thread or threads of the work to the desired lead. The work spindle 15 and the lead screw 16 may be driven one from the other, as through suitable change gears 24. It is, of course, obvious that the arrangement may be such that either the work or the grinding wheel, or both, may be moved to effect the desired pitch of thread on the work. The grinding wheel is mounted on a shaft 17 journalled, as at 18, on a slide 19, which may be moved towards and away from the work in any suitable manner, as by means of a screw 20 having a hand wheel 21. If desired, the screw 20 may be provided with a micrometer 22, by means of which fine adjustment in positioning of the grinding wheel may be had. A pulley 23 may be provided on the shaft 17 to rotate the grinding wheel. A nozzle or spout 30 is provided to direct a flow of a suitable cooling fluid onto the work.

The grinding device 11 is in the form of a cylindrical member formed of abrasive material such as carborundum, and has on its periphery a plurality of serrations or cutting edges 25, 25ª, etc. By preference, each of these serrations is in the form of a separate continuous concentric ring or rib to the plane of which the axis of the wheel is perpendicular. One of the generic features of the present invention resides in so arranging or shaping these serrations or cutting edges of the grinding device (whether or not said edges are stepped or arranged for increment grinding) that a cooling fluid, during the grinding operation, may pass between the grinding wheel and each rib or convolution of the work operated upon so as to minimize the heating effect of the abrasive action on the work and thereby prevent the latter from having its temper drawn. This object may be accomplished by variously arranging or shaping the serrations, as, for example, by making the grooves 9 in the grinding wheel relatively deeper than the actual grinding surfaces of the serrations. The side faces of the serrations may be trued for a distance less than their depths. By preference, the serrations in the grinding wheel may be so arranged that at any given time each of the convolutions of the work is operated upon on one face only; for instance, the serrations or cutting edges of the grinding wheel may be spaced apart a distance further than that between adjacent convolutions so that the serrations will grind non-adjacent convolutions of the thread groove. It is to be understood that the present invention is susceptible of use in grinding grooves and threads of various forms on pieces of work of different kinds, and the machines illustrated in the drawings may be employed for grinding multi-threads as well as single threads. In certain of the figures, the serrations of the grinding wheels are shown as being spaced apart so that they occur at every other convolution on the thread of the work, it being obvious, however, that they may be otherwise spaced depending upon the character of the work. By preference, the serrations or cutting edges of the grinding wheel are spaced apart equal to a multiple of the distance between the successive convolutions of the screw operated upon. Where a thread of very fine pitch is to be gound it may be found to be of advantage to space the serrations three or four times the distance betwen the adjacent convolutions of the thread on the screw. As explained hereinafter more in detail in connection with the description of the truing device, the arrangement of the serrations on the grinding wheel in addition to providing cooling fluid passages therein permits ready and accurate truing of the grinding faces of the serrations, there being ample room between the serrations to insert the diamond points.

In accordance with that species of the invention shown in Figs. 1 to 3b, inclusive, the grinding wheel is arranged so that its serrations will successively grind increments from the successive grooves or convolutions of the work. To this end, the grinding device may have serrations or cutting edges of varying or different sizes or shapes or both, so that, as the grinding wheel is passed longitudinally of the work, each cutting edge or serration will perform but a portion of the grinding operation, the first cutting edge grinding away a small portion or portions from the sides or (and) root of the thread grooves, as the case may be; the second serration taking off a little more, either from the same part, face or portion of the thread convolutions, and on which a previous serration operated, or on a different face or portion thereof, and so on until the thread groove is of a proper size and shape in cross section.

In the illustrated disclosures of Figs. 1 to 3b, inclusive, I have shown the grinding wheel serrations as being of successively increasing diameter or height, and at equal distances from the axis of the wheel, as being of successively increasing width, so that the successive serrations will progressively grind small increments from the sides and root of the groove of the threaded member, but it is to be understood that this showing is by way of exemplification only and, if desired, the construction may be such that the successive serrations will grind different portions of each thread convolution or groove, as, for example, one serration may grind one face or portion of the thread groove and the next one will grind the other face or the root thereof, and so on. If desired, the serrations may be so arranged that they will progressively grind successive increments from the root of the thread groove or from both the sides and the bottom or root of the groove or portions thereof.

Referring more specifically to the grinding wheel shown in Fig. 1, the serrations of the wheel are formed to grind V grooves or threads on the piece of work or tap. It will be seen that the successive serrations are of progressively increasing size in, at least, one dimension, in the present instance, the serrations being all of substantially the same shape and of progressively increasing diameter so that they will progressively grind small portions from the sides and root of the groove. The serration 25ᵃ is slightly higher, i. e., of greater diameter, than the preceding one 25, the serration 25ᵇ slightly higher than the one 25ᵃ, and so on, until the final serration is reached (in the present instance, the serration 25ᶜ) which, in cross section, preferably corresponds exactly to the cross section which it is desired to give to the thread groove. It will be noted that these serrations are of progressively increasing width at like distances from the axis of the wheel. When the arrangement shown in Fig. 1 is employed, the work W is mounted between the work centers of the head and tail stocks, the grinding wheel is properly positioned relative to the work and then the power is thrown on whereupon the work will be moved axially by the lead screw 16 while the work is rotatively driven at the proper rate of speed through the gears 24. The serration 25 will grind a small V-shaped increment 25′ (see Fig. 3); the next serration 25ᵃ will grind an additional increment 25ᵃ′, and so on until finally the serration 25ᶜ will take an increment 25ᶜ′, thereby finishing the thread to the exact shape and size.

The grinding wheel shown in Fig. 2, and designated by the character 11ᵃ, is generally similar to the grinding wheel shown in Fig. 1 with the exception that the serrations are truncated. These serrations, designated by the numerals 26, 26ᵃ, 26ᵇ and 26ᶜ, are of progressively increasing height and, preferably, their truncated edges are of substantially the same width. The serrations are of similar shape and are shown as being spaced apart so as to operate at any one moment on every other convolution of the thread groove. When this wheel is employed for grinding a grooved or threaded member, the serrations will grind successive increments, respectively designated by the characters 26′, 26ᵃ′, 26ᵇ′ and 26ᶜ′, as shown in Fig. 3ᵃ.

Fig. 3ᵇ diagrammatically illustrates the successive increments which a grinding wheel would take from a piece of work, the grinding wheel having its serrations so formed as to grind a Whitworth thread. The construction of the grinding wheel and its mode of use would be similar to those described in connection with the grinding wheels illustrated in Figs. 1 and 2.

It will thus be clear, from the foregoing, that it is possible to accurately grind the thread of the work by relatively passing the grinding wheel but once axially of the work, and since a plurality of edges or ribs are operating simultaneously, the time required to finally grind the threaded or grooved member and take out all the imperfections and inaccuracies therein, due to hardening or other causes, will be materially reduced, so that the work can be economically ground.

Reference will now be had to the machine shown in Figs. 4 to 10, inclusive. In this instance, the machine is provided with a grinding wheel having serrations similar to those of the wheel of the preceding embodiment, except that the serrations are all of the same size and shape; a relatively short back and forth movement between the grinding wheel and the work axially of the latter in accordance with the pitch of the thread to be ground is repeatedly effected, and a relative feeding movement of the grinding wheel and work toward each other is intermittently effected so that the grinding wheel will take successive cuts. The serrations of the grinding wheel are so arranged or constructed that a cooling fluid may be passed between the grinding wheel and each of the thread convolutions operated upon, as in the preceding embodiment.

Referring more specifically to Figs. 4 to 10, $a$ denotes the fixed bed or base; $b$, a rocking bed thereon; $c$, a work holder mounted for reciprocation on the rocking bed substantially in parallelism with the axis about which said bed is rocked, and having head and tail stocks $d$ and $e$, respectively; $f$, a gear box mounted on the rocking bed; and $g$, a grinding wheel mounted in a suitable bearing box $h$ carried by a slide $i$, the latter being mounted on the base $a$ for adjustment at right angles to the axis of the work.

The rocking bed $b$ is L-shaped in plan and is mounted for rocking movement on suitable knife edges 50 (see Figs. 4 and 5) positioned at the forward corners of the base $a$. The work holder comprises, generally, a main slide 53 mounted on ways 54 on the longitudinally extending portion of the rocking bed $b$; a supplemental slide 55 mounted on the main slide and adapted to be adjusted thereon by a screw 56, and the head and tail stocks $d$ and $e$ mounted on a supplemental slide 55. The tail stock may be adjusted as desired. The grinding wheel $g$ is generally cylindrical and has a plurality of cutting edges or ribs 57 (see Fig. 6) all of which are of the same size and shape. Each serration conforms exactly to the shape of the groove of the thread operated upon. In the present instance, the serrations or cutting edges of the wheel are spaced apart so that they will grind non-adjacent convolutions of the thread grooves, whereby the heating effect, due to the abrasive action of the wheel on the work, is minimized, and sufficient space is provided between the serrations to permit of the flow of a suitable cooling fluid thereto. The grooves 58 between the serrations of the wheel are relatively deeper than the active grinding faces of the serrations so as to provide the cooling fluid passages. In the present instance, wherein it is assumed that the work has a single thread, the serrations or cutting edges on the wheel are shown as spaced apart at a distance twice the pitch of the thread and, in this case, it is necessary to rotate the work about two complete revolutions during each operative stroke of the work in order that the grinding wheel will operate upon the thread throughout its entire length. It is, of course, understood that the serrations of the grinding wheel may be spaced apart other than at twice the distance of the pitch of the thread being ground. The grinding wheel may be rotated in any suitable manner, as by means of a belt, passing about a pulley (not shown) secured to the grinding wheel spindle. The slide $i$ on which the grinding wheel is mounted may be adjusted radially of the work in any suitable manner, as by means of a hand screw 59 shown in Fig. 5.

Pivoted, as at 62, in a bracket 63 fixed to the rearwardly extending arm or leg 64 of the rocking bed $b$, is a rocking beam 65 through which certain mechanism or instrumentalities operate to rock the bed and thereby move the work towards and away from the grinding wheel (see Figs. 7 and 8). One of said mechanisms is that for swinging the rocking bed with a succession of small movements so as to feed the work to the wheel. This feeding mechanism includes a nut 66 mounted for sliding movement in a bore within the bracket 63. To the lower end of the nut is keyed a worm wheel 67 which is in mesh with a worm 68. In threaded engagement with the nut 66 and keyed against rotation relative to the bracket 63, as at 69, is a screw 70 having a bearing at its lower end on a block 71 rising from the base $a$. Supported in the upper end of the nut 66 is a pin 73 on which the short end of the rocking beam or lever 65 rests. The worm 68 is carried by a shaft 75 which, as shown most clearly in Fig. 7, extends through the rocking bed to the front of the machine. This shaft may be manually rotated by hand wheel 76 to preliminarily adjust the work radially of the wheel. This shaft is intermittently rotated through mechanism, including the cam R, hereinafter more fully described in detail, for the purpose of swinging the rocking bed a slight distance toward the grinding wheel each time a new cut is to be taken. It is to be understood that, when the shaft 75 is rotated, the nut 66 is turned so that it will move up or down, as the case may be, on the screw 70 and thereby vary the distance between the upper end of the pin 73 and the lower end of the screw 70.

Another mechanism which cooperates with the rocking beam in order to move the work relatively to the wheel is in the form of a cam 78. This cam is intermittently rotated so as to lift the work away from the grinding wheel on the return stroke of the work holder and to again bring the work into operative position when a new cut is to be taken. As shown most clearly in Fig. 7, it engages the underside of the long arm of the rocking beam 65. The cam is secured to the inner end of a shaft 79 journalled in the gear box *f*, and this shaft is intermittently rotated 180° through suitable mechanism which includes an escapement ratchet clutch *t* controlled by the cam R associated with the cam S, as hereinafter described more in detail.

The third mechanism for rocking the rocking bed includes a pattern cam 82 which may be used when it is desired to cut an irregular circumferential contour on the work as, for instance, when it is desired to relieve the teeth of a tap. In the present illustrative disclosure, this cam (see Fig. 7) has four lobes or rises corresponding to the four lands of a four-fluted tap. It is fixed to the end of a shaft 83 which is geared up to the work spindle 84 so as to rotate in synchronism therewith.

The eccentric cam 78 which, for convenience, will be termed a "lifting cam", the pattern cam 82, and the work spindle 84, are driven through the following arrangement: Journalled in the gear box *f* is a main shaft 85 to which is fixed a pulley 86 driven by means of a belt (not shown) passing thereabout. On the inner end of the shaft 85 is a gear 87 meshing with a small gear 88 fixed to a stub shaft 89 which carries a gear 90 which drives a clutch gear 91 adapted to be fixed by a clutch 92 to the shaft 83. On the outer end of this latter shaft is a gear 94 meshing with a gear 95 fixed to a sleeve 96 journalled in a bearing 97. Extending through the sleeve 96 for sliding movement, but splined thereto so as to rotate therewith, is the work spindle 84. The pattern cam 82 which, as stated, is fixed to the shaft 83, and the work spindle 84 are each continuously driven in a single direction. To stop the machine, the handle 98 may be thrown into "off" position. This handle is fixed on a pin 99 which carries, within the gear box, a shipper lever 100 having a roller engaging in a groove of a sleeve 101 splined on the shaft 83 and associated with the clutch 92. This clutch is shown diagrammatically, as it may be of any suitable construction, it being sufficient to say that when the sleeve 101 is moved in one direction the clutch is thrown out, and when moved in the other direction it is thrown in.

The shaft 79, on which the lifting cam 78 is fixed, is intermittently rotated through an escapement clutch shown in plan in Fig. 8, and in elevation and by dotted lines in Fig. 5. Normally loose on the shaft 79 is a unit including a sleeve 104, a gear 105, and a ratchet wheel 106. The gear 105, together with the sleeve 104 and the ratchet wheel 106, is continuously driven by a gear 107 fixed on the main shaft 85. Fixed to the shaft 79 is a disk 108 to one face of which is pivoted a pawl 109 which is normally urged into engagement with the teeth of the ratchet wheel 106 by a spring pressed plunger 110. Intermittent engagement of the pawl with the ratchet wheel is controlled by an escapement mechanism which includes a pair of pivoted levers 111, the inner ends of which are diametrically disposed relative to the ratchet wheel 106. The outer ends of these escapement levers are, by means of spring pressed plungers 112, maintained against opposed abutments 113 upon a vertically movable rod 114 connected at its lower end to a lever 115 fixed on a shaft 116 which extends through the rocking bed to the front of the machine. This shaft 116 is controlled by means of the cam R which also automatically controls the operation of the variable connection by means of which the work is fed towards the grinding wheel each time a new cut is to be taken. When this cam R rocks or rotates the shaft 116 in one direction, the rod 114 is lowered, whereupon the upper escapement lever 111 is moved in a direction to release the pawl 109 and the lower lever is moved into the path of movement of this pawl. This pawl, thus released, will engage the continuously rotating ratchet wheel 106 so that the shaft 79 and the ratchet wheel will rotate in unison. This rotary movement of the shaft 79 is limited to 180° because when the pawl has rotated to that extent it is disengaged from the ratchet wheel by the lower lever 111. When the shaft is thus rotated 180°, it may be assumed that the cam 78 fixed thereto raises the long end of the lever of the rocking beam 65, which means that the rocking bed will be swung in a direction to move the work away from the grinding wheel. When the shaft 116 is rotated in the other direction, the lower escapement lever 111 is moved out of engagement with the pawl 109, whereupon the shaft 79 will be rotated another 180°, and, during this time, the cam 78 will be rotated to the position shown in Fig. 7, thus permitting the long end of the rocking beam to come down, which means that the rocking bed is moved in a direction to bring the work into operative relation to the grinding wheel.

On the forward end of the shaft 75, which is connected to the feed mechanism including the nut 66, is a ratchet wheel 120 and a pivoted lever 121 (see Figs. 4 and 8). One end of this lever carries a pivoted pawl 122 cooperating with the ratchet wheel 120. The other end of the lever 121 is connected by a link 123 to one arm of a bell crank 124 fixed to the forward end of the shaft 116. The other arm of the crank is connected by a link 125 to a T-lever 126. One arm of this lever 126 is connected by a link 127 to a shipper lever 128 which carries a roller 129 cooperating with the cam R. When the T-lever 126 is rocked in one direction, in the present instance, clockwise, the lever 121 is rotated in a clockwise direction so that the pawl 122 will rotate the ratchet wheel 120, together with the shaft 75 on which it is fixed, in a direction which will result in the nut 66 of the feed mechanism moving down on the screw 70, whereupon the rocking bed will swing downwardly and rearwardly to a slight extent to feed the work relative to the grinding wheel. When the T-lever 126 is rocked in counterclockwise direction, the pawl 122 is moved counterclockwise, during which time it will ride over the teeth of the ratchet wheel 120 without imparting rotation thereto.

The cam R is fixed to a shaft 136 which also carries the cam S for moving the work holder on its operative and inoperative strokes. This shaft is driven from the work spindle in a single direction in any suitable manner, as, for instance, through the train of gears 137$^a$, 137$^b$, etc. The first gear 137$^a$ of the train is fixed to the sleeve 96, shown most clearly in Figs. 5 and 8, and the last gear 137$^e$ is fixed to the outer end of the shaft 136. The gear 137$^d$ is a change gear carried by a rocker arm 138. The cam S has a circumferential groove in which engages a roller or follower 141 journalled on a pin 142 driven into a lug 143 extending from a flanged bushing 144 fixed in a bore 145 in the left hand end of the main slide 53 of the work holder. The parts 141, 142 and 143 are shown in dotted lines in Fig. 9 since, in the other figures, they are above the plane on which Fig. 9 is taken. The inner end of the shaft 136 has a bearing in this bushing 144 so that the shaft is held against flexure and vibration. The cam groove has a pitch portion 140$^a$ and a return portion 140$^b$. The cam surface 140$^c$ of the pitch portion, and against which surface the follower 141 engages while the cam is moving the work holder on its operative stroke, is so inclined as to move the work axially at a rate corresponding to the pitch of the thread being ground. This cam surface extends more than half way round the cam, it being of such length as to move the work holder axially of the work during the time required to bring the work into engagement with the wheel, to grind the work, and then move the work away from the wheel, and during this time the work spindle is given more than one complete revolution. In the present illustrative disclosure, since it has been assumed that a piece of work having a single thread is operated upon and the grinding wheel has its serrations spaced apart a distance twice the pitch of the thread, the pitch portion of the cam is of such length that it moves the work holder on its operative stroke while the work is making four complete revolutions. During the first revolution of the work, the latter is being brought into engagement with the wheel; during the second and third revolutions the grinding wheel is operating upon the work, and during the fourth revolution the work is being moved away from the wheel. The return portion 140$^b$ of the cam has a cam surface 140$^d$ facing in a direction opposite to the cam surface 140$^c$. This cam surface 140$^d$ is of such length and so inclined as to return the work holder on its inoperative stroke, preferably while the work is making one complete revolution. The cam surfaces 140$^c$ and 140$^d$ are so related that when the roller leaves one of these surfaces, it is immediately picked up by the other, so that there is substantially no lost motion. The cam S is keyed to the shaft 136 and it is secured against longitudinal movement, and in any desired position of adjustment on the shaft 136, by a clamping screw 151 passing through spring fingers or portions 152 of the cam.

The cam R (see Figs. 8, 9 and 10) includes a sleeve 155 and dogs 157, 158, adjustably secured thereto. In the present illustrative disclosure, the sleeve has a circumferential T-groove 159 which receives square flanged nuts 160. The dogs are secured to these nuts by bolts 161. The dog 157 has a cam surface 157$^a$ which, while the cam S is just completing the operative stroke of the work holder, engages the roller 129 and throws the shipper lever 128 in a direction to so actuate the escapement clutch mechanism that the lifting cam is turned 180° from the position shown in Fig. 7 so as to swing the rocking bed upwardly and forwardly and thus withdraw the work from the grinding wheel. Also, when the shipper lever 128 is thus turned, the pawl 122 is moved in that direction (counterclockwise) in which it will ride over the teeth of the ratchet wheel 120 without turning the feed shaft 75. The dog 158 has a cam surface 158$^a$ which, while the cam S is beginning the operative stroke of the work holder, throws the lever 128 in a direction to cause the pawl 122 to rotate the feed shaft 75 and also to cause actuation of the escapement clutch mechanism, whereupon the lifting cam will be rotated 180° to the position shown in Fig. 7. Thus, when the cam surface 158$^a$ is actuating the lever 128, the feed mechanism is actuated to feed the work slightly towards the wheel, and the lifting cam is turned to swing the rocking bed downwardly and rearwardly to bring the work into operative position relative to the wheel. The cam R is splined to the shaft 136 by a key 163 extending into a groove 150 in the shaft 136. The cam R is clamped against longitudinal movement on the shaft 136 between a bushing 164 and a nut 165, the latter being locked in place by a clamping screw 166. The bushing 164, through which the shaft 136 extends, is journalled in a sleeve 167 secured in a bracket 168 by bolts or screws 169. The bracket 168 is secured to the left hand end of the rocking bed b. Secured to the outer end of the sleeve 167 is the rocker arm 138 which carrries the change gear 137ᵈ.

The operation of the machine shown in Figs. 4 to 10, inclusive, is briefly as follows: A cam S, the cam surfaces of which will depend upon the pitch of the thread to be ground, the number of threads on the work and the number of serrations on the grinding wheel, is selected and secured on a shaft 136; the proper change gear 137ᵈ is secured to the rocker arm 138, and the dogs 157 and 158 are properly adjusted. Assuming that the machine has been thrown into operation and the work holder is completing its operative stroke, the cam surface 157ᵃ will engage the roller on the shipper lever 128 and, through the connections described, will move the pawl 122 in that direction in which it will ride over the teeth of the ratchet wheel 120. Also, when this lever is thus thrown, the upper escapement lever 111 will be released from the pawl 109 whereupon the lifting cam 78 will be rotated 180° from the position shown in Fig. 7, and when this cam is so rotated, it will swing the rocking bed upwardly and forwardly so as to withdraw the work from the grinding wheel. The cam surface 140ᵈ of the cam S will now come into play to move the work on its return or inoperative stroke. After the work has been moved on its inoperative stroke, it is again started forward by the cam surface 140ᶜ on its operative stroke, at which time the cam surface 158ᵃ will come into play and throw the lever 128 in a direction to cause the pawl 122 to rotate the ratchet wheel 120, which, acting through the feed mechanism, will swing the rocking bed slightly downwardly and rearwardly so as to feed the work a slight distance towards the wheel. About this time, the escapement ratchet clutch mechanism is again operated so that the lifting cam 78 will rotate 180° to the position shown in Fig. 7, thus permitting the rocking bed to swing downwardly and rearwardly and bring the work into operative relation to the grinding wheel. While the work is being brought into engagement with the grinding wheel, as just described, the work is making one revolution and it is being moved by the cam S in accordance with the pitch on the work. The cam S will continue to move the work holder in accordance with the pitch of the thread while the work is making two more revolutions, and, during this time, the grinding wheel is operating on the work. The cam S continues to move the work in accordance with the pitch of the thread thereon during the time that the work is moved out of engagement with the wheel, and then the return portion of the cam S, while the work is making another revolution, will return the work to its original point. This sequence of operations is repeated until the threaded member has been brought down to desired size. During the entire grinding operation, a cooling fluid is passed between each of the convolutions of the thread and the grinding wheel; that is, the fluid flows through the passages or grooves 58 in the wheel. The cooling fluid may be applied through a nozzle 170 positioned above the line of contact between the grinding wheel and work.

Referring to Fig. 11, there is shown a grinding wheel $g'$ having a plurality of serrations 57′ operating upon a member or screw having an Acme or truncated thread. In this instance, the grinding serrations of the wheel are spaced apart a distance equal to that between adjacent convolutions of the thread, so that there is a grinding serration operating upon each convolution. This arrangement may be adopted where the thread is similar to an Acme and is of relatively large pitch, in which instance there is sufficient metal in the thread to carry away part of the heat generated during the grinding operation. It will be seen from this figure, that the grooves 58′ between the serrations of the grinding wheel are relatively deeper than the active grinding side faces of the serrations, so that there is a space left between the grinding wheel and the top of each convolution of the thread through which a cooling fluid may pass during the grinding operation. The grinding wheel, shown in Fig. 11, may be substituted for the one in the machine illustrated in Figs. 4 to 10, in which case a cam, similar to the cam S, will be selected but having its cam surfaces so arranged that it will move the work on its operative stroke a distance equal to the pitch of the thread operated upon, during which time the work will make one complete revolution. The dogs 157 and 158 will be adjusted so that they will function in proper relation to the cam S.

It will be obvious from the foregoing descriptions that in each of the embodiments illustrated, since, during the grinding operation on the work, a plurality of serrations or cutting edges are simultaneously effective, and these serrations each perform but a relatively small part in grinding away excess metal from the work to bring the thread to the desired size and shape, grinding of the work may be very quickly carried out with precision, and the grinding wheel will not wear out as rapidly as would be the case where a single cutting serration is provided so that repeated truing of the wheel is not required, all of which means that threaded members, perfect in all respects, may be produced in a shorter space of time with less labor and at a materially reduced cost. As hereinafter explained more in detail, when the wheels do need truing, they may be re-shaped very accurately and quickly.

It will be further seen that in each embodiment illustrated, since, during the entire grinding operations a cooling fluid is passed between the wheel and each of the ribs or thread convolutions on the work, the heat generated by the abrasive action is prevented from heating the work to such an extent as to injure the same as, for example, by drawing its temper. As stated, the flow of cooling fluid may be provided for by making the grooves between the serrations of the grinding wheel substantially deeper than the active grinding faces of the serrations, and, by preference, particularly where the pitch of the thread to be ground is relatively small, the serrations of the grinding wheel are spaced apart at a multiple of the distance between adjacent convolutions of the thread or threads. With the arrangements described, the extent of relative movement between the grinding wheel and work, axially of the latter through a distance equal to that between corresponding points of corresponding grinding faces of adjacent convolutions, is greater than the projections onto the axis of the wheel, of the active grinding surfaces of the serrations between these points. This will be very readily understood from Figs. 2, 6 and 11. The distance between two corresponding points of adjacent serrations of the grinding wheel may be indicated by the line $p$. The projections onto the axial line of the wheel of the active grinding surfaces of the serrations between these points may be indicated by the letter $q$. It will be seen that the line $p$ is longer than the combined lengths of the lines $q$ between the selected points.

Each of the machines illustrated in the drawings is provided with mechanism for shaping or truing the serrations of the grinding wheel. The truing mechanisms are similar in construction and, therefore, a description of one is explanatory of both. The truing device is shown, more or less diagrammatically, in Fig. 2. A commercial embodiment is illustrated in Figs. 1, 12, 12ª, 13 and 14. Referring to these figures, and particularly to Fig. 12, 185 indicates a slide mounted on a support 186 for movement back and forth in parallelism with the axis of the grinding wheel. This support 186 may be located to that side of the grinding wheel opposite the work holding means, as shown in Fig. 1, or to the same side, as shown in Figs. 4, 5 and 13. By preference, the truing device is pivotally supported in order that it may be thrown out of the way when not in use. To this end, it may be fixed to a shaft 172 journalled in suitable bearings 173. In Fig. 1, these bearings 173 rise from the rear of the base 10. In the machine shown in Figs. 4 to 10, and Fig. 13, the bearings 173 are provided on a bracket 174 adjustably fixed to the front face of the rocking bed $b$. At the ends of the shaft 172 are anti-friction thrust bearings 175. 176 is an adjusting screw against which the shaft is maintained by a spring 177. The slide 185 may be clamped in position by a bolt 178 having on its inner end (see Fig. 13) a bushing 179 adapted to engage a flexible guard 180 carried by the slide 185. Mounted on the slide 185, for movement on lines which are parallel to the respective side faces of the serrations of the grinding wheel to be trued, are slides 187 and 188 which carry, at their forward ends, diamond points 189 and 190, respectively. The slides 187 and 188 are guided by ways 191 (see Fig. 14) fixed to the slide 185 by screws 192. For the purpose of limiting the extent of movement of the slides and the diamond points carried thereby towards the wheel, each of the slides 187 and 188 is provided with a set screw 193 adapted to engage the rear end of a respective way 191. The slides 187 and 188 may be longitudinally reciprocated so as to move the respective diamond points back and forth across the faces of the serrations, in any suitable manner, as, for instance, by means of a lever 194 pivoted to the slide 185 as at 195 and having a bifurcated end 196 adapted to straddle pins 197 carried by the slides 187 and 188. The truing means, comprising the diamond points, are indexed relatively to the grinding wheel so that they may successively operate on the serrations and, to this end, the following arrangement may be provided. 200 is a lead screw journalled in the support 186 and having threaded engagement with the slide 185. On the outer end of this screw is a handle 201 by means of which it may be rotated. Fixed to the screw 200 is a pinion 202 meshing with a gear 203 fixed to the hub of a disk 204 journalled on a stud 205. This stud has a rectangular portion 206 engaging in a horizontally extending slot 207 in a part of the support 186. The stud is clamped in adjusted position in the slot by a nut 208. Fixed to the outer end of the stud and against rotation is an arm 209 provided with a spring pressed plunger 210, the outer end of which is provided with a handle or knob and the inner end of which is adapted to be engaged in a notch or slot 211 in the disk 204.

When it is desired to true the serrations of the grinding wheel embodied in the machine of Figs. 4 and 5, the truing device is thrown over to the operative position shown in Figs. 4 and 13, and the grinding wheel is advanced into operative relation to the truing device, as by turning the hand wheel 59. A gear 203 of such size will be selected that, when it is rotated by the pinion 202 one complete revolution, the slide 185 will be moved a distance corresponding to that between adjacent serrations on the grinding wheel. The support 186, together with the parts carried thereby, may be adjusted axially of the grinding wheel, in order that the diamond points are in proper relation to the serrations, by turning the screw 176. After the truing device has been properly set up, the slide 185 may be brought to the position where the diamond point 190 will operate upon the first convolution, and in this position the plunger 210 will engage in the notch 211 of the disk 204. The diamond point 190 will be moved back and forth by rocking the free end of the handle 194, in this first indexed position so as to true the left hand face of the first serration, referring to Fig. 12. After the left hand face of the first serration is thus trued, the plunger 210 is drawn out, and the screw 200 is rotated by turning the handle 201. When the diamond point 190 is thus brought into proper indexed relation to the next serration, the plunger 210 will spring into the slot or notch 201, thereby preventing further rotation of the screw 200. The diamond point 190 is now moved back and forth across the left hand face of the second serration by rocking the handle 194. The diamond point 190 is thus indexed to successive positions and moved back and forth across the corresponding side faces of the several serrations until these side faces are properly trued. Then the diamond point 189 will be brought into proper position to grind the right hand face of the first serration of the grinding wheel. The handle 194 will be reversed so that the bifurcated end 196 thereof straddles the pin 197 of the slide 187. This handle will be rocked back and forth so that the diamond point will be moved across the right hand face of the serration. The diamond point 189 is successively indexed so as to operate upon the several serrations in the same manner as was the diamond point 190. After the wheel has been trued, the truing mechanism may be swung out of the way, and the grinding wheel may be moved into position to operate on the work without changing the axial relation of the wheel and the work holder.

When the truing mechanism is employed for shaping or re-shaping the stepped serrated wheel of Fig. 1, the grinding wheel is moved rearwardly to a position where the diamond points may operate upon the serrations thereof. The diamond points are indexed axially of the grinding wheel and are moved back and forth in each indexed position so as to resurface the respective side faces of the serrations in the same manner as in the preceding embodiment, except that the grinding wheel is moved radially, as by turning the hand wheel 21, a very slight distance each time the diamond points are indexed so that the serrations will be of increasing diameter, which means that they will be of successively increasing widths at equal distances from the axis of the wheel. The positioning of the wheel may be determined by the scale or micrometer 22. More specifically, assuming that the diamond points 189 and 190 have retrued the respective faces of the first serration 25 the truing device will be indexed to the right (Fig. 1), and the grinding wheel will be moved slightly away from the truing device. The diamond points 189 and 190 will then be moved back and forth across the faces of the second serration 25ª. The diamond points will then be again indexed, the grinding wheel will be moved radially a slight distance towards the front of the machine, and the diamond points will then be moved back and forth to true the faces of the third serration 25ᵇ. This sequence of steps will be repeated until the side faces of all the serrations are properly trued. All of the serrations will now be of V shape and of progressively increasing diameter. The side faces of the serrations are trued for a portion of their depths only because the grooves in the grinding wheel are substantially deeper than the extent to which the serrations project into the work during the grinding operation.

The grinding wheel shown in Fig. 2 may be trued in the same manner as that just described in connection with the grinding wheel shown in Fig. 1 and, additionally, the edges of the serrations are truncated so as to form flats. These flats, in the present illustrative disclosure, are all of the same width and of progressively increasing diameters. To truncate the serrations or true the flats after the serrations have been truncated, one of the diamond points may be adjusted with respect to the serration 26 and then the slide 185 is moved longitudinally so as to cause the diamond point to truncate the first serration 26. The grinding wheel is then moved slightly away from the diamond point and then the latter is moved axially of the wheel and across the serration 26ª, and this operation is repeated for the successive serrations.

The truing device is shown more or less diagrammatically in Fig. 2. The parts of this truing device which correspond to those just described bear corresponding reference numerals, except that the same are primed. The micrometer or scale 215 may be employed for properly indexing the diamond points. The slides 187' and 188' may be moved back and forth by turning the screws 216. The truing device in this figure is illustrated as having a central slide 217 carrying a diamond point or cutting tool 218. This tool may be employed for roughing out the grooves in the wheel. It may also be employed to truncate the serrations. The serrations may be made of progressively greater diameters in the same manner as in the preceding embodiment, i. e., by positioning the wheel at successive distances from the truing device.

It is of importance to note that, since the grooves in the grinding wheel are substantially deeper than the extent to which the serrations project into the work during the grinding operation, it is necessary to true the side faces of the serrations for a portion of their depths only, and thus a more precise and accurate form of serration can be more conveniently obtained. In the preferred form of wheel, where the serrations are spaced apart so as to grind non-adjacent convolutions of the thread groove, there is sufficient space between the convolutions to accommodate the diamond point, a feature which is of considerable importance, particularly in cases where a thread of fine pitch is to be ground. Not only does the spacing of the serrations permit of a more ready accommodation for the diamond points and avoid the necessity of truing the roots of the grooves, but it allows a closer scrutiny of the action of the diamond points upon the serrations during the truing process.

When it is desired to grind a thread of large lead angle, such as shown in Fig. 15, the axis of the grinding wheel is inclined perpendicularly to the lead of the thread on the work. In this position, the serrations of the grinding wheel extend substantially in the direction of the thread angle of the work instead of across the thread, as would be the case if the two axes were placed parallel. In order to thus angularly adjust the wheel so that its serrations are inclined correspondingly to the lead of the thread, the journal boxes, which carry the grinding wheel spindles, may be adjustably mounted on arcuate brackets. The mounting of the wheels in both embodiments is somewhat similar, and the general arrangement will be best understood from Fig. 17. It will be seen from this figure, that the journal boxes 18 (or the journal box $h$, as the case may be) are carried by gibs 230 on an arcuate bracket 231 arising from the slide 19 (or the slide $i$, of Fig. 5). The center of curvature of the bracket 231 is preferably about a point 233 in the center of the grinding wheel, by which is meant a point at the axis of the wheel substantially mid-way between its ends. The serrations are so shaped and trued that, at the point or line at which they engage the work, they will be of such contour and size as to properly and respectively operate on those portions or faces of the thread, as has been planned. In the present illustrative disclosure, the truing devices are moved in a plane including the axis of rotation of the work and the point 233. In other words, they move in the practical grinding plane which substantially includes the axis of the work and the line of contact between the work and wheel, so that the serrations on the grinding wheel are trued and shaped to desired size and shape. It is true that, with the arrangement shown in Figs. 15, 16 and 17, one end serration will engage the work slightly above the point of engagement between the central serration and the work, while the other end serration will engage the work slightly below the last mentioned point and, for all practical purposes in truing the wheel, this deviation is negligible, and the grinding plane may be considered as substantially including the axis of the work and the point of contact between the work and the several serrations or, at least, a mean of those points of contact. The serrations on the grinding wheel may be of like size and shape, or they may be stepped to effect increment grinding.

As many changes could be made in the above construction and many apparently widely different embodiments of the invention could be made without departing from the scope thereof, it is intended that all matter contained in the above description, or shown in the accompanying drawing, shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a machine for grinding on metal work pieces convolutions corresponding in cross section to a screw thread and in combination, means for rotatably supporting a piece of work, a grinding wheel of abrasive material having a plurality of spaced concentric grinding serrations adapted to simultaneously operate upon a plurality of convolutions on the work and spaced apart a distance which is a multiple of the distance between adjacent convolutions on the work so as to allow for passing of a cooling fluid between the grinding wheel and the part of each convolution on the work during the grinding operation means for rotatably supporting the grinding wheel with its serrations in engagement with the convolutions on the work, and means for moving the work longitudinally.

2. In a precision thread grinding machine and in combination, a grinding wheel of abrasive material provided with a plurality of circumferential grinding serrations corresponding in cross section to a screw thread, means for rotatably supporting the grinding wheel with its serrations simultaneously in engagement with a plurality of convolutions on the work, means for moving the work in accordance with the lead of the thread, means for rotating the work more than one revolution while moving a distance equal that between corresponding points of adjacent serrations, and means for supplying a cooling fluid between the grinding wheel and each thread convolution.

3. In combination, a grinding wheel of abrasive material provided with a plurality of parallel separated grinding serrations arranged to simultaneously grind a plurality of convolutions on a metal work piece, means for rotatably supporting the piece of work, means for rotatably supporting the grinding wheel in engagement with the work, means for moving the work longitudinally, the extent of such longitudinal movement of the work through a distance equal that between corresponding points of adjacent serrations on the wheel being greater than the projections onto the axis of the wheel of the active grinding surfaces between said points, and means for supplying a cooling fluid between said grinding wheel and each convolution on the work.

4. In a machine for simultaneously grinding a plurality of convolutions on metal work pieces and in combination, means for rotatably supporting a work piece, a rotatable grinding wheel of abrasive material having spaced serrations arranged to successively grind increments from each convolution formed in the work piece, and means for moving the work and wheel one relatively to the other generally longitudinally of the work to bring each serration into engagement with the successive convolutions on the work piece.

5. In combination, an abrasive grinding wheel having spaced circumferential serrations corresponding in cross section to a screw thread and varying in dimensions with respect to one another so as to grind successive increments from successive convolutions of the work, means for supporting the work with the serrations of said wheel in simultaneous engagement with the convolutions on the work, and means for moving the work and wheel one relative to the other to cause the serrations to successively operate upon each convolution on the work.

6. In combination, an abrasive grinding wheel having a plurality of circumferential grinding serrations corresponding in cross section to a screw thread, means for rotatably supporting a piece of work, means for rotatably supporting said wheel with said serrations simultaneously engaging a plurality of convolutions on the work in the grinding place, said serrations being of the same shape and angle and of progressively increasing width and chord length in said plane, and means for moving the work generally longitudinally to bring the serrations into successive engagement with each convolution and grind increments therefrom.

7. In combination, a grinding wheel having a plurality of separate parallel serrations of progressively increasing size, means for rotatably supporting the grinding wheel, means for supporting the work, means for moving the work and wheel one relative to the other generally longitudinally of the work to cause the serrations to progressively grind successive increments from each convolution on the work, said serrations being spaced apart at a multiple of the distance between successive convolutions on the work, and means for passing a cooling fluid between the wheel and each convolution on the work during the grinding operation.

8. The method of grinding screws, taps, and the like, which consists in bringing into engagement the work piece and a grinding wheel having a plurality of separate serrations parallel to each other, moving the work piece and grinding wheel longitudinally one relative to the other in accordance with the lead of the thread, rotating said grinding wheel, rotating said work more than one revolution while relatively moving the same longitudinally a distance equal that between corresponding points of adjacent serrations, and passing a cooling fluid between the grinding wheel and a part of each thread convolution during the grinding operation.

9. The method of simultaneously grinding a plurality of convolutions on a metal work piece, which consists in rotating, while in engagement with the work, a grinding wheel having spaced serrations simultaneously effective on a plurality of convolutions on the work, and relatively moving the work and wheel to cause the successive serrations to grind successive increments from the convolutions.

10. The method of simultaneously grinding a plurality of convolutions on a hardened metal work piece by utilizing a grinding wheel having a plurality of separate, parallel serrations of progressively increasing width and diameter, which consists in positioning the work and wheel so that the serrations extend into the work progressively greater distances, rotating the grinding wheel and work while in engagement, and relatively moving the work and wheel longitudinally of the work to bring each serration into successive engagement with the convolutions.

11. The method of grinding screws, taps, and the like, which consists in rotating, while in engagement, the work and a grinding wheel having spaced serrations of varying dimensions whereby to cut successive increments from the convolutions of the thread, and moving the wheel and work one relative to the other longitudinally of the work in accordance with the lead of the thread to bring each serration into successive engagement with the convolutions.

BENGT M. W. HANSON.